(No Model.) 2 Sheets—Sheet 1.
W. W. GREEN.
CORN HARVESTER.
No. 571,857. Patented Nov. 24, 1896.
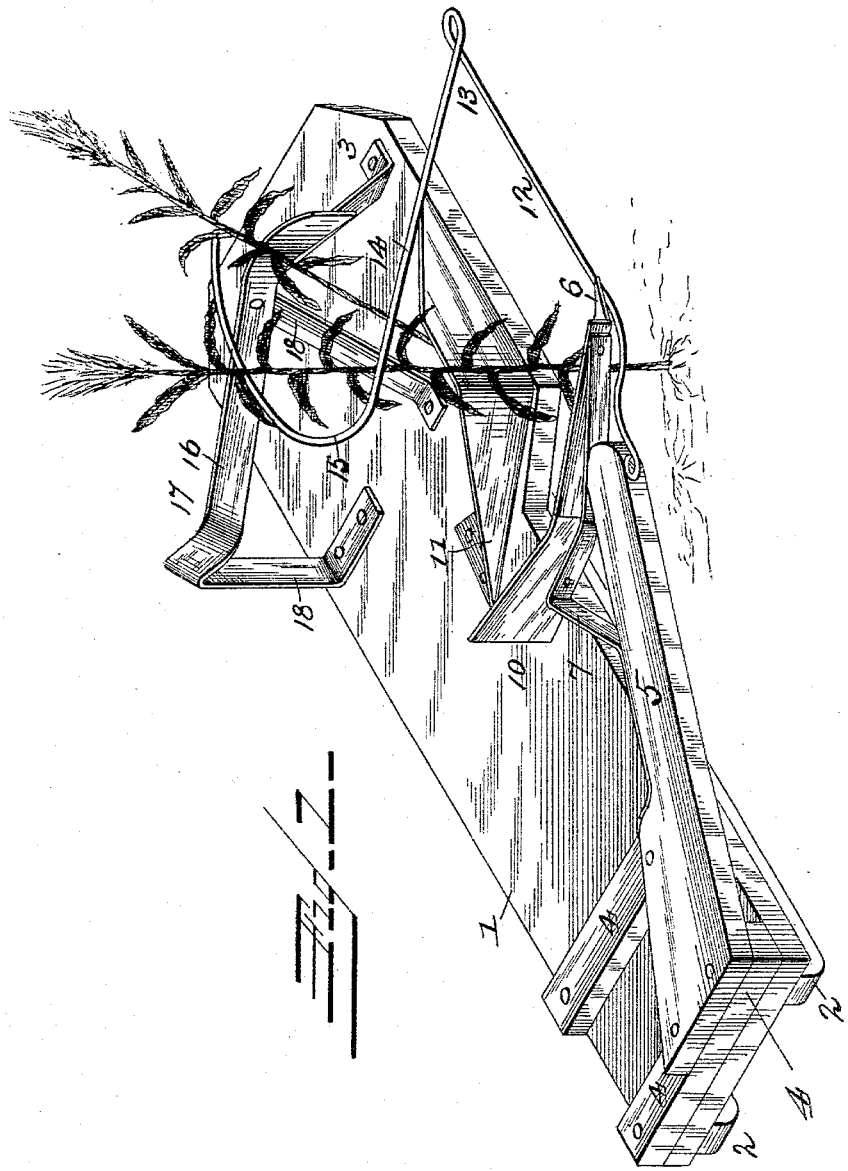
Witnesses
F. L. Durand
W. B. Smith
Inventor
Wm. W. Green
By J. H. Burwell
Attorney (No Model.) 2 Sheets—Sheet 2.
W. W. GREEN.
CORN HARVESTER.
No. 571,857. Patented Nov. 24, 1896.
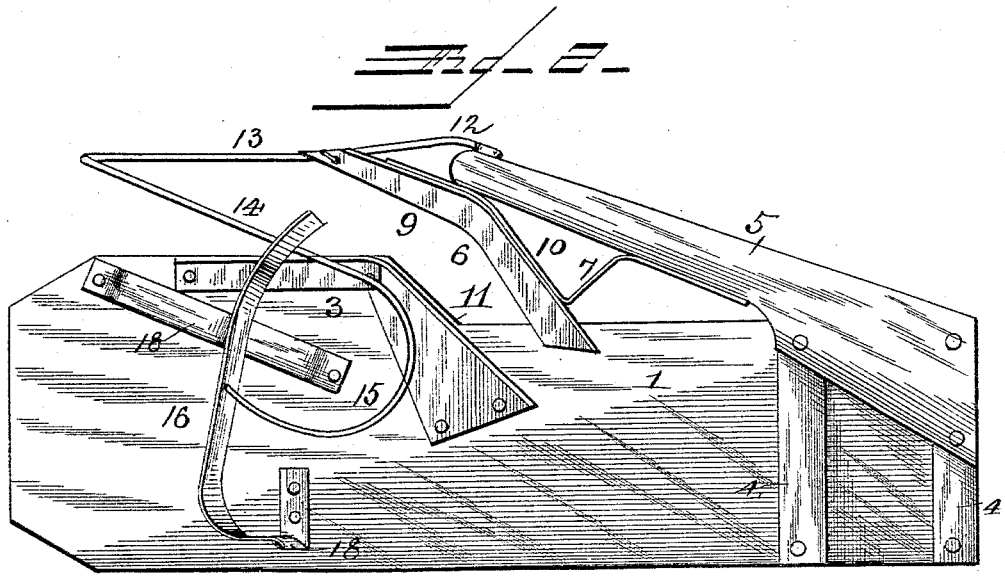
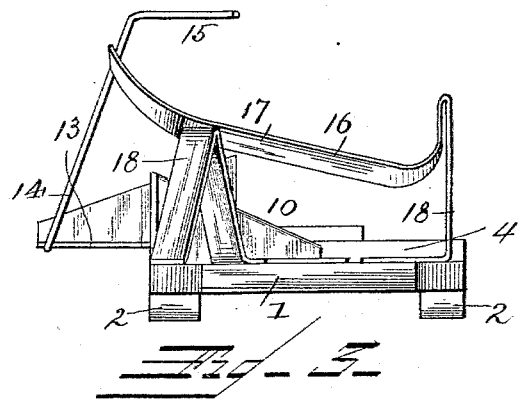
Witnesses
Inventor
Wm. W. Green
Attorney

UNITED STATES PATENT OFFICE.

WILLIAM W. GREEN, OF YORKTOWN, KANSAS.

CORN-HARVESTER.

SPECIFICATION forming part of Letters Patent No. 571,857, dated November 24, 1896.

Application filed July 22, 1895. Serial No. 556,747. (No model.)

*To all whom it may concern:*

Be it known that I, WILLIAM W. GREEN, a citizen of the United States, residing at Yorktown, in the county of Lincoln and State of Kansas, have invented certain new and useful Improvements in Corn-Harvesters; and I do declare the following to be a full, clear, and exact description of the invention, such as will enable others skilled in the art to which it appertains to make and use the same.

The invention relates to a corn-harvester.

It has for its object to provide a corn-harvester which may be dragged along the ground and which will effectively cut the corn and deposit it upon a cradle, from which it may be gathered by a person and shocked.

With these objects in view the invention consists of certain features of construction and combination of parts which will be hereinafter set forth.

In the accompanying drawings, Figure 1 is a perspective view of my improved corn-harvester, showing it as it cuts and gathers the cornstalks, one of the stalks being in the holder, while another is shown in the act of being cut. Fig. 2 is a top plan view of the same, and Fig. 3 is an end view looking from the front.

In the drawings, 1 denotes the frame of the holder, which consists of a flat board and which may be mounted upon wheels, but is shown in the present instance as being provided with runners 2 on its under side. The body is cut away at one side to form an offset 3 for the purpose hereinafter to appear. Secured to the rear end of the body and supported above the same by cleats 4 is a diagonal forwardly-extending arm 5, which is provided with a stalk-cutter 6. This cutter is secured to the arm by an iron strap 7 and is arranged directly at the rear of the offset, and is provided with a forwardly-extending flange 10. The forward edge of the bent or angular portion of the cutter is sharpened, as at 9.

Secured on the upper surface of the body is a guard 11, the front portion of which is parallel with the side edge of the body and the rear portion of which is bent to one side at an angle to correspond to the angle formed by the cutting edge of the cutter. This rear portion is also inclined downwardly. A guide 12 is secured to the arm 5, and consists of the forwardly horizontally-projecting portion 13, which is bent and inclined rearwardly, as shown at 14, and terminates in a forwardly-projecting hooked portion 15.

A support or cradle 16 is secured to the upper side of the body in advance of the hooked portion of the guide, and consists of a curved bar 17, having standards 18, by means of which it is attached to the body.

In operation, as the harvester is drawn along the ground, stalks coming in contact with the upwardly-inclined portion of the guide will slide with their lower ends along the edge of the knife upon the inclined edge of the shield, when the rear angular portion of the knife will sever the stalk, and the stalk will then fall into the cradle and its lower end roll over the inclined edge of the shield. The attendant, who is riding on the harvester, will then shock the stalks. By elevating the knife above the under side of the body of the harvester and by providing the edge of the body with the offset grass and stubble will not interfere with the movement of the harvester, as it will readily pass over such obstructions. By the provision of the guard frail and slender stalks, which would otherwise be pressed down to the ground under the harvester as it moves along, will be supported while being cut, and the ends thereof falling back against the upwardly-extending flange on the cutter will insure the stalks falling into the cradle.

Having thus described my invention, what I claim, and desire to secure by Letters Patent, is—

In a corn-harvester, the combination with the body provided with an offset and runners, of the diagonally-arranged bar 5, a brace-bar 4 bolted to the body and to the bar 5, a knife 6 secured thereto and having an angular portion provided with a forward cutting edge, said knife being arranged directly in rear of the offset, the upwardly-extending flange 10 on the cutter, and the guard 11 having its front portion parallel with the side edge of the body and its rear portion bent to one side at an angle corresponding with the angle of the cutting portion of the cutter, the guide 12 secured to arm 5, and consisting of the forwardly-projecting horizontal portion 13, bent rearwardly at 14, and having the forwardly-projecting hooked portion 15 extending over the body of the machine, and the cradle 16 in advance of the hooked portion 15 and below the same and consisting of a curved bar 17 having standards 18 secured to the body.

In testimony whereof I affix my signature in presence of two witnesses.

WILLIAM W. GREEN.

Witnesses:
CHARLES ELLIS,
KATE ELLIS.